(12) United States Patent
Garay et al.

(10) Patent No.: US 7,412,055 B2
(45) Date of Patent: Aug. 12, 2008

(54) METHOD AND SYSTEM FOR FAIR EXCHANGE OF USER INFORMATION

(75) Inventors: Juan A. Garay, West New York, NJ (US); Carl B. Pomerance, Watchung, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 804 days.

(21) Appl. No.: 10/611,771

(22) Filed: Jun. 30, 2003

(65) Prior Publication Data

US 2005/0018847 A1 Jan. 27, 2005

(51) Int. Cl.
*H04L 9/00* (2006.01)

(52) U.S. Cl. .............................. 380/30; 713/2; 380/262; 705/64

(58) Field of Classification Search ................... 380/30; 705/64; 713/2
See application file for complete search history.

(56) References Cited

U.S. PATENT DOCUMENTS 4,944,009 A * 7/1990 Micali et al. .................. 380/46

2002/0049601 A1 * 4/2002 Asokan et al. .................. 705/1
2003/0018932 A1 * 1/2003 Blum et al. ..................... 714/46

OTHER PUBLICATIONS

Williams Stallings, Cryptography and Network Security Principles and Practive, 1999, Prentice-Hall, Inc., Second Edition, pp. 149-156.*
Boneh and Naor, Timed Commitments (Extended Abstract), Advances in Cryptology, Crypto '00 vol. 1880 of Lecture Notes in Computer Science, pp. 236-254, Springer-Verlag 2000.

* cited by examiner

*Primary Examiner*—Gilberto Barron, Jr.
*Assistant Examiner*—Carlton V Johnson (57) ABSTRACT

A method and system for a fair exchange of user information over a network is disclosed. The method comprises the steps of: transmitting over the network the user information encoded in association with a hidden value selected as one of a plurality of values distributed in a sequence wherein a difference between adjacent ones of said values increases and decreases symmetrically about one of the values of a known order; transmitting over said network a first set of the values and a last value in the sequence, wherein the values in said first set have increasing differences between adjacent ones of the values; and transmitting, individually, and in response to receipt of the other user's values, the remaining values in said sequence.

10 Claims, 5 Drawing Sheets

METHOD AND SYSTEM FOR FAIR EXCHANGE OF USER INFORMATION

RELATED APPLICATION

This application is related to co-pending U.S. patent application Ser. No. 10/610803, entitled "Method and System for Determining Sequence Parameters to Limit Cycle Attack in Timed Release Cryptography," concurrently filed and incorporated by reference herein.

FIELD OF THE INVENTION

This application is related to the field of electronic information exchange and more specifically to methods for improving the exchange of user information, which allows for the exchange of cryptographically-transformed data, such as digital signatures.

BACKGROUND OF THE INVENTION

The exchange of information that may identify and/or validate a user's approval of a transaction, for example, a digital signature, a credit card number, etc., is an important aspect of commercial transactions. Contract signing is one important operation in commercial transactions wherein the signatures of a buyer and seller on a single textual document obligate each party to fulfill the terms of the contract.

With the significant increase in electronic transactions occurring over networks such as the Internet or World Wide Web (WWW), where parties do not necessarily trust one another, there is need for establishing the validity of the identity of the parties entering and authorizing an electronic transaction. Digital signatures have emerged as the leading mechanism for such validation. However, the mere exchange of digital signatures may render a significant advantage to one party at the expense of the other party.

Considerable efforts have been devoted to develop protocols that mimic the features of "paper contract signing," particularly the "fairness" aspect. As is recognized in the art, current contract signing protocol, or more generally, an exchange of digital signatures, is fair if at the end of protocol, either both parties have valid signatures or neither does. Early work on fair exchange of digital signatures or secrets that hid digital signatures has focused on the gradual release of a portion of "key" information that allows both parties to substantially concurrently decode the other's signature or secret information. See for example, *"Practical and Provably Secure Release of a Secret and Exchange of Signatures,"* I. B. Damgard, Journal of Cryptology, 8(4) pp 201-222, Autumn 1995, which disclosed that if each party alternately releases a small portion of the secret information, then neither party has a considerable advantage over the other party. However, the method disclosed has drawbacks in real situations. One problem is that of an uncertain termination. In this case, if one party fails to receive information from the other party, the receiving party will not be certain whether there was a failure in the network or the transmitting party has decided not to continue in the transaction. Another problem is that one party may obtain an advantage over the other party by deriving the other party's secret information using significantly more computing power.

These problems have been investigated and reported in *"Timed Commitments (extended abstract),"* D. Boneh and M. Naor, Advances in Cryptology—CRYPTO '00, volume 1880 of Lecture Notes in Computer Science, pp. 236-254, Springer-Verlag, 2000. To overcome the problems noted, an elegant "timing" mechanism based on modular exponentiation, an operation which is believed not well suited to being solved by using multiple computers operating in parallel, i.e., parallelization or parallelized processing, was proposed. Using this proposed mechanism, a variety of timed primitives, including timed commitment, timed signature and timed contract signing, are shown to fairly exchange Rabin and RSA signatures having a modulus that is a Blum integer, i.e., a special type of modulus that fits the time structure. As would be known to those skilled in the art, Rabin and RSA are methods of signing information using public and private keys.

However, this method is limited to special kind of signatures, i.e., Rabin and RSA signatures with a modulus that is a Blum integer. Accordingly, there is a need for a method and system that allows for a fair exchange of digital signatures without the restriction above, and which further allows both parties to reconstruct the other's information substantially concurrently in case of a break in communication.

SUMMARY OF THE INVENTION

A method and system for a fair exchange of user information over a network is disclosed. The method comprises the steps of: transmitting over the network the user information encoded in association with a hidden value selected as one of a plurality of values distributed in a sequence wherein a difference between adjacent ones of said values increases and decreases symmetrically about one of the values of a known order; transmitting over said network a first set of the values and a last value in the sequence, wherein the values in said first set have increasing differences between adjacent ones of the values; and transmitting, individually, the remaining values in said sequence. In one aspect of the invention, the remaining values are transmitted in response to acknowledgements received. By using the hidden value to transform the user's information, the method and system allows for the fair exchange of information, such as standard digital signatures.

It is to be understood that these drawings are solely for purposes of illustrating the concepts of the invention and are not intended as a definition of the limits of the invention. The embodiments shown in FIGS. 3 through 5 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

Figure 1:
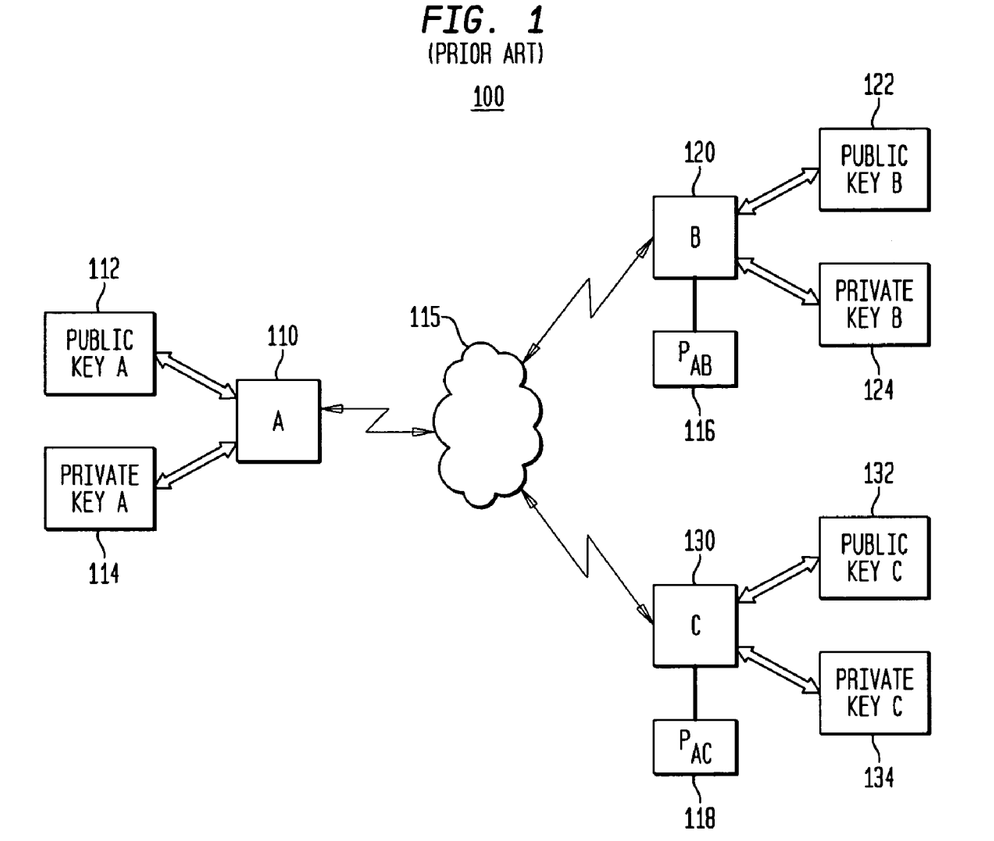
FIG. 1 illustrates a conventional public-key encryption technology user information exchange over a network.

FIG. 1 illustrates a conventional public-key encrypting/signing system 100. In this system, each party 110, 120, 130 possesses at least one public/private key determined in accordance with one or more of well known conventional encryption/signing algorithms. In this illustrated example, party 110 is associated with public key 112 and private key 114. Similarly, party 120 is associated with public key 122 and private key 124 and party 130 is associated with public key 132 and private key 134. Each party may then distribute (or this can be done by a so-called "certification authority") one or more of its public keys to each other party over network 115. Party 110 may then encrypt a message to party 120 by using the public key 122 provided by party 120. The encrypted message may then be transmitted over network and received by parties 120 and 130. Party 120, using an associated private key 124 may then decrypt the encoded message from party 110. Party 130, although able to receive the encrypted message lacks private key 124 that is necessary to decrypt the received message. Conversely, Party 110 may sign a message using his associated private key and send it to party 120, who can verify the signature by using the public key 112 provided by party 110. The use of public/private key is well known in the art and is used in public-key/private-key crypto-systems such as RSA, Schnorr, DSA, El-Gamal, etc.

In another aspect, conventional signing methods may be used to uniquely establish the validity of a message signed by a party. For example, party 110 may provide a public key 120 to party 120, which is referred to as $P_{ab}$ 116 and provide a second public key 120 to party 130, which is referred to a $P_{ac}$ 118. Party 100 may then sign a message using a private key 114 associated with the public key $P_{ab}$ 116 and transmit the signed message over network 115. Parties 120, 130 may both receive the signed message, but only party 130 having the public key 116 is capable of verifying the validity of the signed message.

However, the receiving party upon receiving the signed message is able to immediately verify the message and have access to the transmitting party's information. This places the transmitting party at a disadvantage with respect to the receiving party as the receiving party may not provide substantially concurrent transmission of his/her own identification or secret information.

One method to provide a timed release of user information is disclosed by "Timed Release of Standard Digital Signatures," Garay and Jakobsson, Pre-Proceedings of the 7$^{th}$ Annual Financial Cryptography Conference, Jan. 27-30, 2003. In this method user secret information, such as the digital signature, is encoded, wrapped or bind-ed with a hidden value and information necessary to determine the encoding, wrapping, blinding or binding value is released or provided in a controlled manner. With each additional release of information, a receiving party receives one more clues to determine the hidden value used to blind the secret information. Eventually, sufficient information is released that enables the receiving party to determine the transmitting party's hidden value and unwrap, unblind or unbind the digital signature or the secret information. More specifically, the method constructs a time-line using a Blum-Blum-Shub (BBS) sequence that is used to determine a hidden value and the information to be released that allows the receiving party to determine the hidden value. In this case, "time-line" refers to the well-formed values within the sequence and not a particular time oriented function. More specifically, the "time-line" is representative of a plurality of elements, wherein each subsequent element is obtained by iterative squaring of the prevous element value. The "time-line" may thus be identified by its endpoints and at least one element corresponding to a value on the line.

Blum-Blum-Shub (BBS) sequences may suitable represent a "time-line" as referred to herein as BBS sequencesare well known in the art to be of the form:

$$x_0, x_1, x_2 \ldots x_n \quad [1]$$

with $x_0 = g^2$ (modulo N) for random g in the set of $Z_N^*$;
$x_i = x_{i-1}^2$ (modulo N);
$Z_N$ is the set of integers in $\{0, 1, \ldots N-1\}$;
$Z_N^*$ is the multiplicative group of $Z_N$,
i.e., the numbers in $Z_N$ which are co-prime with N; and
N is a Blum integer in form of $N = p_1 p_2$.

Blum integers are well known in the art, wherein $p_1$ and $p_2$ are prime numbers congruent to 3 modulo 4. For example, 21 is a Blum integer as it is the product of $p_1$ and $p_2$ having values of 3 and 7, respectively.

The Garay and Jackobsson time-line may be formulated using a BBS sequence as:

$$\left\{ g^2, g^4, g^{16}, \ldots, g^{2^{2^i}}, \ldots, g^{2^{2^{K-1}}}, g^{2^{2^K}} \right\} \pmod{N} \quad [2]$$

where, N is a Blum integer;
g is an element of large odd order in the set of $Z_N^*$;
K is a known value (preferably, K=80) and
The exemplary sequence represented by equation 2 may be represented in closed-form as:

$$\left( g^{2^{2^i}} \right)_{i=0}^{K} \bmod(N) \quad [3]$$

Figure 2:
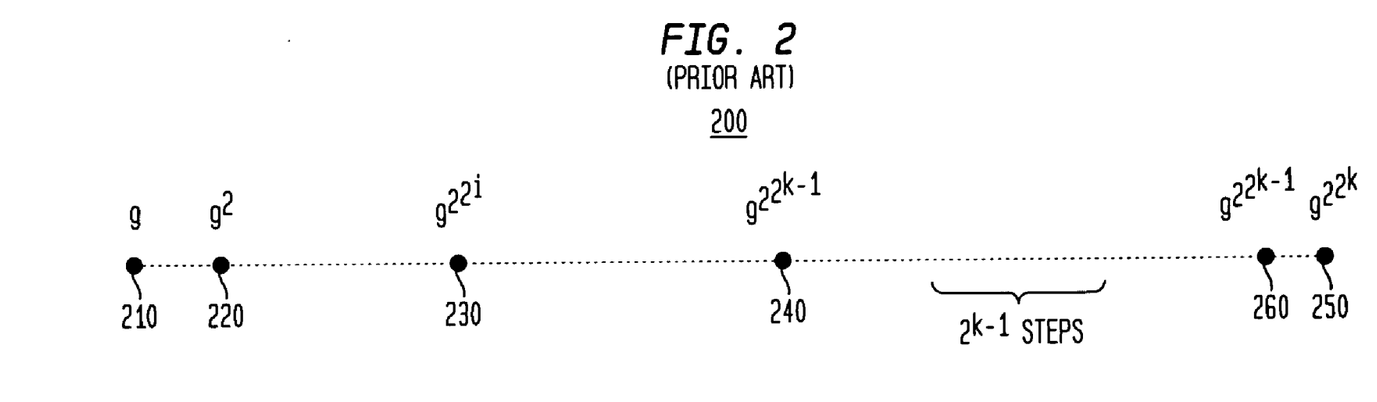
FIG. 2 illustrates graphically a conventional method for determining information markers used to determine a hidden value for binding user identification/verification information.

FIG. 2 illustrates graphically a BBS sequence 200 wherein values 220, 230, 240, 250 are determined in accordance with equation 3. Value 210, i.e., g, is included as an initial value. As should be recognized by those skilled in the art, each entry i is obtained by $2^{i-1}$ squarings of the preceding value and, hence, the distance or difference between adjacent values increases geometrically. More specifically, as should be recognized in the art, there are at least $2^{K-1}$ values or steps between last value 250 and the preceding sequence value 240. Hence, intermediate values between adjacent values 240 and 250 may be determined by squaring a current value for each of the $2^{K-1}$ intervening or intermediate steps.

The hidden value 260, used to blind user information, may be selected as any value or element within the sequence. In one aspect, hidden value 260 may be selected as any value not determined by equation 3. Preferably, hidden value 260 is selected as the value immediately preceding last value 250 as this represents the greatest distance between adjacent values in sequence 200. In this preferred aspect, hidden value 260 may be determined as:

$$\left( g^{2^{2^{K-1}}} \right) \bmod(N) \text{ or, more specifically:} \quad [4]$$

$$\sqrt{g^{2^{2^K}}} \quad [5]$$

Selection of hidden value 260 as the value immediately preceding last value 250 is advantageous as significant effort is necessary to determine hidden value 260 even from the next-to-last or penultimate value 240 in sequence represented by equation 3.

Using this method for blinding or binding a hidden value determined in accordance with equation 4, the reception of values 210, 220, 230, 240, 250 referred to as identification or reference or sequence markers provides a receiving party with sufficient information to determine hidden value 260. Consequentially, if transmission is interrupted, a significant effort is needed to determine intermediate identification markers and hidden value 260 from the limited data received. Hence, neither party achieves a distinct advantage over the other party in case of an interruption in communication. However, the transaction is also terminated.

Figure 3:
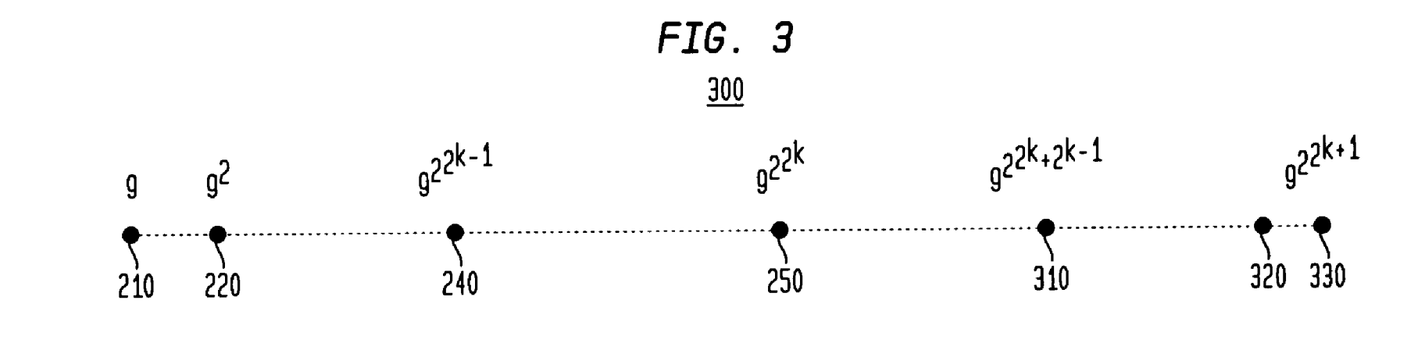
FIG. 3 illustrates graphically a method for determining information markers used to determine a hidden value for binding user information in accordance with the principles of the present invention.

FIG. 3 illustrates graphically a time-line sequence 300 for determining hidden value 320 in accordance with the principles of the invention. In this time-line sequence 300, a first set of values is determined in accordance with equation 3 above and shown in FIG. 2. Time-line sequence 300 is then further extended to contain the mirror-image of the first set of values about a value of known order. In this illustrated case, about the value $$g^{2^{2^K}}$$

250, i.e., order K. Values 210, 220, 240 are 310, 320 and 330 are symmetrically distributed about value 250. Sequence 300 may further be represented as:

$$g \left\| \left( g^{2^{2^i}} \right)_{i=0}^K \right\| \left( g^{2^{2^{K+1}-2^{K-j}}} \right)_{j=1}^K \right\| \left( g^{2^{2^{K+1}}} \right) \mod(N) \quad [6]$$

$$\text{where} \left( g^{2^{2^{K+1}-2^{K-j}}} \right)_{j=1}^K \text{ is the mirror-image of } \left( g^{2^{2^i}} \right)_{i=0}^K$$

As would be recognized by those skilled in the art, first term, g, and last term, $$g^{2^{2^{K+1}}},$$

are included in the sequence to provide a sequence initial and an end point. As would further be understood, the sequence determined by equation 6 is such that the difference between adjacent values in the mirror image decreases in a manner similar to the difference between adjacent value increases. The symmetric difference between adjacent values may be more clearly shown using the following example, wherein K is selected equal to 5. In this example, the sequence determined by equation [6] is represented as:

$$\left\{ g, g^2, g^{2^2}, g^{2^4}, g^{2^8}, g^{2^{16}}, g^{2^{32}}, \right. \quad [7]$$

$$\left. g^{2^{48}}, g^{2^{56}}, g^{2^{60}}, g^{2^{62}}, g^{2^{63}}, g^{2^{64}} \right\} \pmod{N}$$

In this case, the difference between adjacent sequence values geometrically increases then geometrically decreases about the value of order K, i.e., $$g^{2^{2^{32}}}.$$

Hidden value 320 may then be determined, as previously described, as that value immediately preceding last value i.e., $$g^{2^{2^{64}}}$$

in sequence 300. In this case, hidden value, 320 is determined as the value $$g^{2^{2^{63}}}$$

which may be determined directly from the sequence shown in equation 6.

Figure 4:
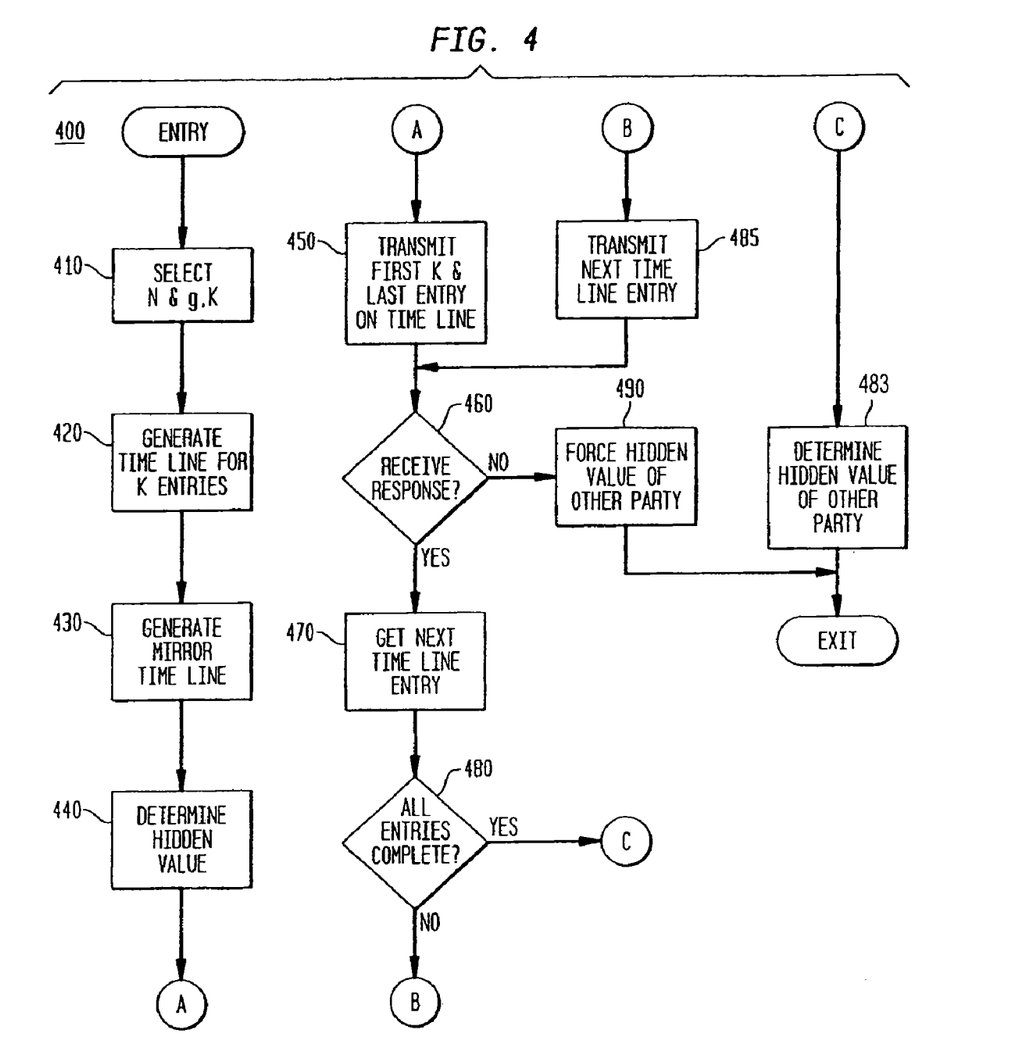
FIG. 4 illustrates a flow chart for determining and exchanging information markers in accordance with the principles of the invention.

FIG. 4 illustrates a flow chart of a process 400 for determining a hidden value and a fair exchange of the information that allows both parties to obtain substantially concurrent determination of each others hidden value in accordance with the principles of the invention. More specifically, at block 410 time-line generation factors g, N and K are selected. At block 420, a first set of K identification marker values is determined in accordance with equation 3. As would be appreciated, an initial value may be further added to the sequence. As noted previously, this first set is representative of values having increasing differences between adjacent values. At block 430, a second set of K identification markers is determined as the mirror image of the values in the first set. This second set of sequence values is representative of values having a decreasing difference value between adjacent values. The difference between adjacent values is symmetrically distributed about that value associated with the known order K.

At block 440, a hidden value is determined. In a preferred aspect of the invention, the hidden value is selected as the value immediately preceding the last value among the 2K values.

At block 450, the first set of K values and the last value are transmitted to a receiving party over a network. At block 460, a determination is made whether a response to the transmission has been received, i.e., the other party has acknowledged the transmission and provided comparable information.

If the answer is in the affirmative, then a next value or identification marker in the sequence is selected at block 470 and a determination, at block 480, is made whether all markers have been transmitted. If the answer is in the affirmative, then a determination of the other party's hidden value may be made, at block 483, from each of the information items received.

However, if the answer is in the negative, then a next value is transmitted to a receiving party at block 485. Processing returns to block 460 to await a response to the transmitted value.

If the answer at block 480, however, is negative, then the hidden value of the other party may then be determined based on the information items previously received, at block 490.

As the difference between successive values that are interactively transmitted in response to acknowledgements continues to decrease, another party's hidden value may be determined if there is an interruption in the transmission in at most twice the number of operations used by the first party. Hence, neither party obtains a significant advantage over the other.

Although the present invention has been disclosed with regard to an interactive exchange of identification markers between the parties, it would be recognized that the information markers may be released on a timed or periodic basis.

Figure 5:
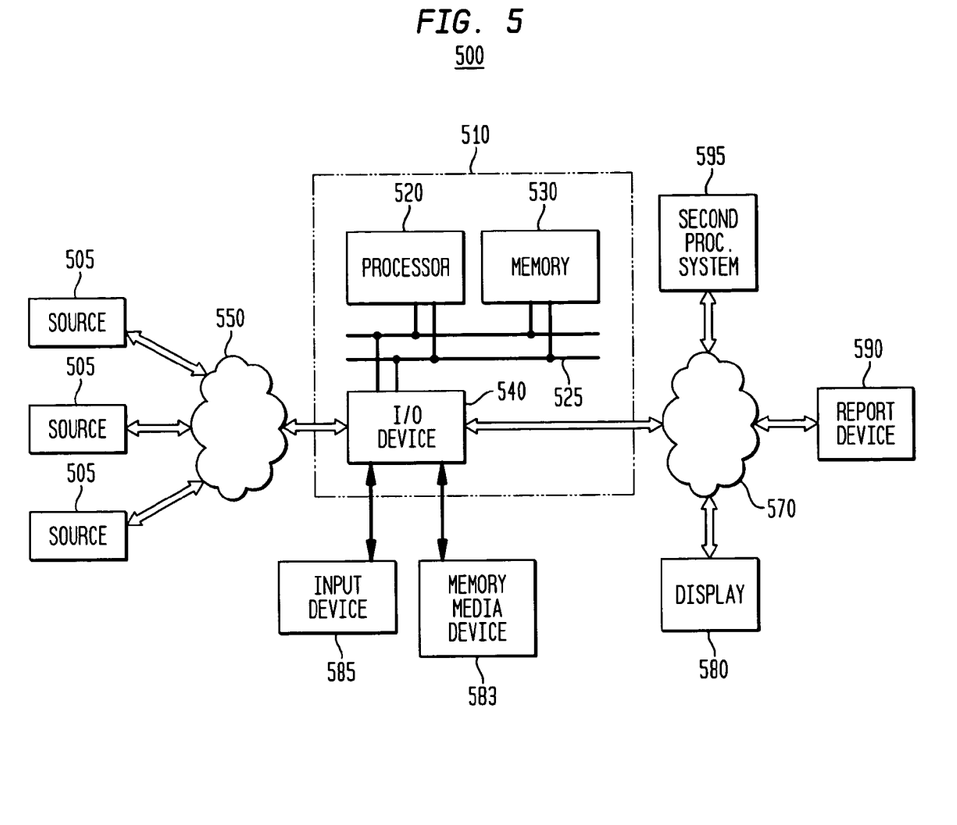
FIG. 5 illustrates a system for implementing the process illustrated in FIG. 4.

FIG. 5 illustrates a system 500 for implementing the principles of the invention as depicted in the exemplary processing shown in FIG. 4. In this exemplary system embodiment 500, input data is received from sources 505 over network 550 and is processed in accordance with one or more software programs executed by processing system 510. The results of processing system 510 may then be transmitted over network 570 for viewing on display 580, reporting device 590 and/or a second processing system 595.

More specifically, processing system 510 includes one or more input/output devices 540 that receive data from the illustrated source devices 505 over network 550. The received data is then applied to processor 520, which is in communication with input/output device 540 and memory 530. Input/output devices 540, processor 520 and memory 530 may communicate over a communication medium 525. Communication medium 525 may represent a communication network, e.g., ISA, PCI, PCMCIA bus, one or more internal connections of a circuit, circuit card or other device, as well as portions and combinations of these and other communication media. Processor 520 may be representative of a handheld calculator, special purpose or general purpose processing system, desktop computer, laptop computer, palm computer, or personal digital assistant (PDA) device, etc., as well as portions or combinations of these and other devices that can perform the operations illustrated in FIG. 4.

In one embodiment, processor 520 may include code which, when executed, performs the operations illustrated herein. The code may be contained in memory 530, read/downloaded from a memory medium such as a CD-ROM or floppy disk represented as 583, or provided by manual input device 585, such as a keyboard or a keypad entry, or may read data from a magnetic or optical medium (not shown) which is accessible by processor 520, when needed. Information items provided by input device 583, 585 and/or magnetic medium may be accessible to processor 520 through input/output device 540, as shown. Further, the data received by input/output device 540 may be immediately accessible by processor 520 or may be stored in memory 530. Processor 520 may further provide the results of the processing shown herein to display 580, recording device 590 or a second processing unit 595 through I/O device 540.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operation illustrated in FIG. 5 may be performed sequentially or in parallel using different processors to determine specific values. Processor system 510 may also be in two-way communication with each of the sources 505. Processor system 510 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 550 and 570 may also be internal networks, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

Figure 6:
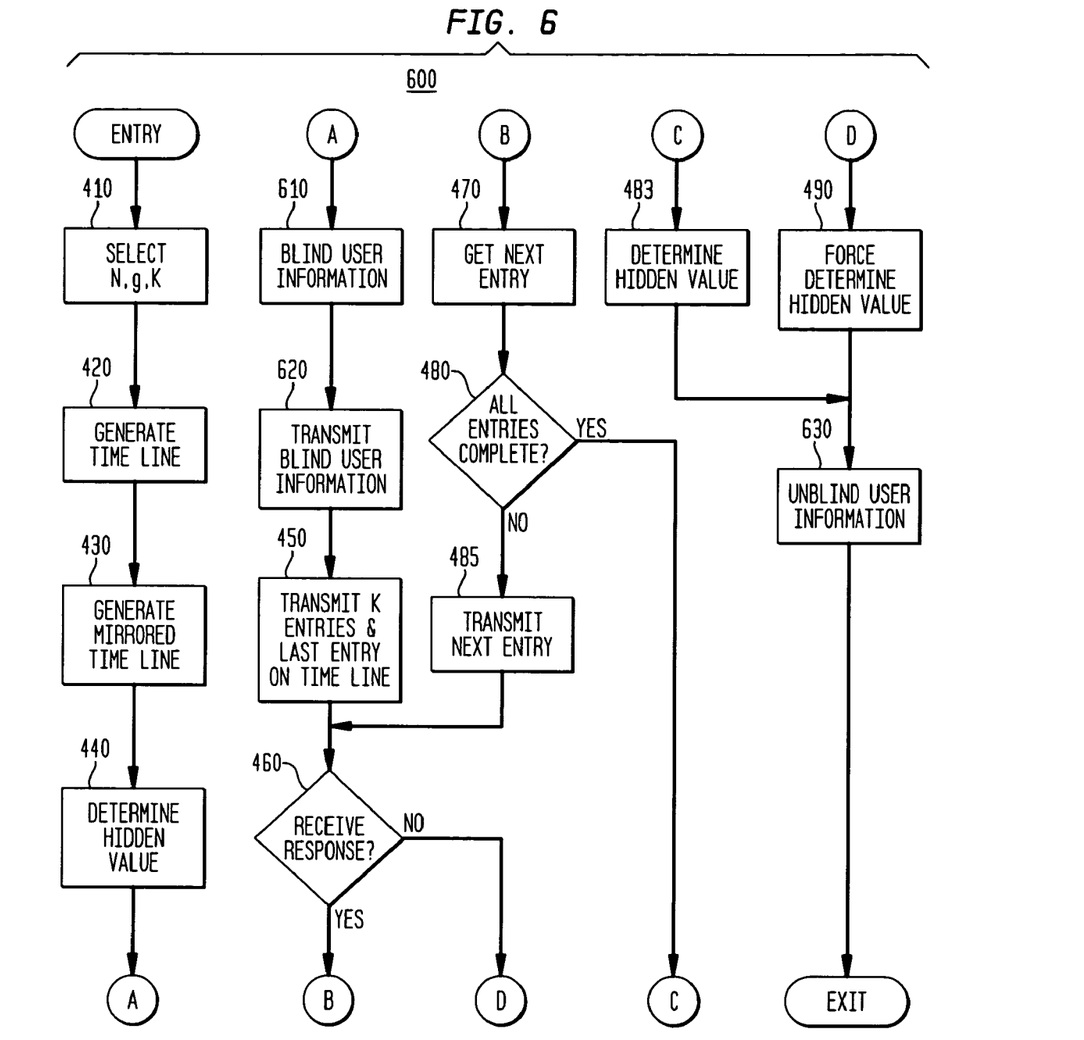
FIG. 6 illustrates a flow chart for exchanging digital signatures in accordance with the principles of the invention.

FIG. 6 illustrates a flowchart of a process 600 for exchanging user information in accordance with the principles of the invention. In this process, each of the steps, with regard to determining a hidden value as shown in FIG. 4, i.e., blocks 410, 420, 430 and 440 are performed. At block 610, the user information is encoded, wrapped, blinded or binded with the hidden value and the encoded value is transmitted over a network at block 620. Information markers, as previously discussed with regard to FIG. 4, are interactively exchange in response to acknowledgments of receiving the information marker values, i.e., blocks 450, 460, 470, 480, and 485. When each of the information markers are successfully transmitted, more specifically received, then the other party's hidden value may be determined at block 483. Similarly, if there is an interruption in the transmission, the other party's hidden value may be determined at block 490. The other party's user information may then be decoded, unwrapped, unblinded, or unbinded using the determined hidden value at block 630.

Although not shown, it should be recognized by those skilled in the art that the transmission of a blinded or bind-ed digital signature may be transmitted during or after the transmission of a first set of K identification or reference markers. Furthermore, the system shown in FIG. 5 is also suitable to execute the processing shown in FIG. 6.

In another aspect of the invention, value verification values (not shown) may be transmitted before or after the sequence values or concurrently with each sequence value. The use of verification values are well known in that they provide assurances that the identification values transmitted are in fact associated with the sequence generated in accordance with equation 6. Sequence values are of the form of:

$$u_i = g^{2^{2^i}} \bmod(N), \text{ for } 0 \leq i \leq K \qquad [8]$$
$$v_j = g^{2^{2^{K+1}-2^{K-j}}} \bmod(N), \text{ for } 1 \leq j \leq K$$

where $u_i$ is associated with the first set of K values; and
$v_i$ is associated with the second set of K values.

The validation values or the correctness of the first set of K values is known by showing that each triple $<g, u_i, u_{i+1}>$, for $0 \leq i \leq K$, is of the form $<g, g^x, g^{x^2}>$ for some x. Similarly, the correctness of the second set of K values is established by a zero-knowledge proof that the tuples $<g, u_{K-1}, u_K, v_1>$ and $<g, u_{K-j}, u_{j-1}, v_j>$ for $2 \leq i \leq K$ are so-called Diffie-Hellman tuples. Diffie-Hellman tuples are more fully described in "*The Decision Diffie-Hellman Problem*", D. Boneh, Proceedings of the Third Algorithmic Number Theory Symposium (LNCS 1423), Springer-Verlag, pp. 48-63, 1998.

In a preferred aspect of the invention, the factors of the Blum integer, N, may be determined such that:

$$p_1 = 2 \times q_1 + 1; \text{ and}$$

$$p_2 = 2 \times q_2 + 1 \quad [9]$$

where $q_1$ and $q_2$ are also prime numbers.

Integers $q_1$ and $q_2$ may further be selected to satisfy the condition that the period of the sequence $2^i \bmod (q_1 q_2)$ exceeds $2^{500}$. Selecting $q_1$ and $q_2$ in this manner is advantageous it provides for protection against so-called cycle attacks, which originate from repeats in the sequence. Cycle attacks are know in the art are possible when the minimum number of elements in a sequence before the same element occurs, i.e., sequence period, is shorter than the total number of elements in the sequence. In this case, it may be possible to compute a hidden value in a number of operations smaller than the number of repeated sequence element squarings that separate the identification markers along a time-line.

In a preferred embodiment of the invention, the sequence generating parameters are further selected such that the value of K is at least eighty (80) and g is any number such that (g3−g) is co-prime to N. In this case, the period of the underlying sequence shown in equation 6 may be shown to exceed $2^{900}$.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the present invention has been disclosed with regard to digital signatures, it would be recognized by those skilled in the art that the present invention may be used with any information a user may desire to keep secret until appropriate assurances from the receiving party are available. Thus, the present invention is suitable for electronic transfers of information associated with all basic types of e-commerce transactions, including electronic payment (e.g., exchanging an item such as a movie for an "e-coin"), electronic contract signing or, more generally, exchange of digital signatures on any type of data, etc. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method fairly exchanging a hidden value of a first user for a hidden value of a second user, by a series of exchanges between the first user and the second user leading up to completing said hidden values, comprising the steps of:

establishing a modulus and a modular function known to the first user and known to the second user, said modular function iteratively producing a plurality of sequence values wherein each said sequence value is related, according to said modular function, to a next previous sequence value, whereby conformance to the modulation function can be determined for adjacent ones of the plurality of sequence values;

establishing a total number of iterations over which the sequence values will be exchanged between the first user and the second user;

iteratively exchanging the sequence values of the first and second users, progressing in a predetermined order toward an end of said sequence values;

completing the exchange provided that the total number of iterations are completed, and terminating the exchange if the total number of iterations are not completed.

2. The method of claim 1, wherein said plurality of values are determined according to the modular function by a root value and a modulus value.

3. The method of claim 1, wherein said sequence values are determined over a known order equal to the total number of iterations, wherein each said sequence value is a result of the modular function applied to a next previous sequence value, raised to a power related to a difference in position between said sequence value and a respective beginning and end of the order.

4. The method of claim 3, wherein said modulus value is a product of Blum integers.

5. The method of claim 4, wherein said Blum integers comprise prime numbers.

6. The method of claim 1, wherein said hidden value is a value immediately preceding a last value of said sequence.

7. The method of claim 1, wherein said number of iterations is at least 80.

8. A system for exchanging user information over a network comprising:

at least one programmed processor coupled to a memory and arranged for conducting a fair exchange of a hidden value of a first user for a hidden value of a second user, by a series of exchanges between the first user and the second user leading up to completing said hidden values;

establishing a modulus and a modular function known to the first user and known to the second user, said modular function iteratively producing a plurality of sequence values wherein each said sequence value is related, according to said modular function, to a next previous sequence value, whereby conformance to the modular function can be determined for adjacent ones of the plurality of sequence values;

establishing a total number of iterations over which the sequence values will be exchanged between the first user and the second user, iteratively exchanging the sequence values of the first and second users, progressing toward an end of said sequence values;

completing the exchange provided that the total number of iterations are completed, and terminating the exchange if the total number of iterations are not completed.

9. The system of claim 8, further comprising a further processor and wherein said processor and said further processor exchange said sequence values on behalf of the first and second users, respectively.

10. The system of claim 8, wherein said processor is operable to effect the series of exchanges on a timed-basis.

* * * * *